United States Patent

Gold et al.

[11] Patent Number: 6,012,676
[45] Date of Patent: Jan. 11, 2000

[54] INTEGRATED FIRE AND FLIGHT CONTROL SYSTEM WITH AUTOMATIC ENGINE TORQUE LIMITING

[75] Inventors: Phillip J. Gold, Shelton, Conn.; Donald L. Fogler, Jr., Kent, Wash.

[73] Assignee: Sikorsky Aircraft Corporation, Stratford, Conn.

[21] Appl. No.: 09/052,628

[22] Filed: Mar. 31, 1998

[51] Int. Cl.[7] .................................................. B42C 27/04
[52] U.S. Cl. ......................................... 244/17.13; 701/4
[58] Field of Search ........................... 244/17.13, 17.11, 244/17.19, 17.21; 701/4, 7, 8, 14, 11

[56] References Cited

U.S. PATENT DOCUMENTS

| | | | |
|---|---|---|---|
| 5,178,307 | 1/1993 | Wright et al. | 244/17.13 |
| 5,238,203 | 8/1993 | Skonieczy et al. | 244/364 |
| 5,263,662 | 11/1993 | Fowler et al. | 244/89 |
| 5,310,135 | 5/1994 | Fowler et al. | 244/89 |
| 5,310,136 | 5/1994 | Fowler et al. | 244/89 |
| 5,331,881 | 7/1994 | Fowler et al. | 89/364 |
| 5,428,543 | 6/1995 | Gold et al. | 364/244 |
| 5,465,212 | 11/1995 | Fowler et al. | 364/244 |
| 5,850,615 | 12/1998 | Osden | 701/4 |

OTHER PUBLICATIONS

System Development Report, May 1996 (pp. 35–27 only).
Preliminary Design Review, May 1996 (slide PDR–11 only).
Development Review Briefing Notes, Mar. 24, 1997 (see Slides IFFC DR 61–63.
System Development Report, Mar. 24, 1997 (see pages 35–37).

*Primary Examiner*—Galen L. Barefoot
*Attorney, Agent, or Firm*—Dominic J. Chiantera; Moore & Van Allen, PLLC

[57] ABSTRACT

An integrated fire and flight control (IFFC) system senses the actual engine torque of a rotary wing aircraft in successive real time intervals and compares the sensed interval values with one or more reference maximum torque limits for each of one or more prescribed maximum time intervals and, in the presence of an above limit actual torque for an above limit prescribed time interval, the IFFC automatically reduces the collective axis command.

15 Claims, 6 Drawing Sheets

INTEGRATED FIRE AND FLIGHT CONTROL SYSTEM WITH AUTOMATIC ENGINE TORQUE LIMITING

This invention was made with Government funded support under Contract No. DAAJ02-95-C-0034 awarded by the Department of the Army. The Government has certain rights in this invention.

DESCRIPTION

1. Technical Field

This invention relates to flight control systems for rotary wing aircraft, and more particularly to an integrated fire and flight control system of the type in which the fire control portion supplements the authority of the flight control portion during pilot selectable intervals.

2. Background Art

Integrated fire control and flight control systems are known for use in weapon equipped rotary wing aircraft to coordinate the aircraft's flight attitude with that required for accurate launching or firing of the aircraft's weapons. These integrated systems embody both an automated flight control function, which controls the aircraft's response in its yaw, pitch, roll and collective axis to the sensed state of the aircraft's flight dynamics, to provide stable aircraft responsiveness to pilot commanded maneuvers, as well as a fire control function which modifies the flight control authority under certain circumstances to provide optimum aircraft-to-target orientation for weapon launch. One such integrated fire and flight control (IFFC) system is disclosed and claimed in commonly owned U.S. Pat. No. 5,331,881 entitled *Helicopter Integrated Fire and Flight Control Having Azimuth and Pitch Control*, issued Jul. 26, 1994 to Fowler et al.

The '881 referenced IFFC system provides an override of the flight control authority in the yaw and pitch axes by replacing the yaw attitude feedback error signal and the pitch attitude feedback error signal with an azimuth command signal and an elevation command signal provided by fire control circuitry. The purpose is to desensitize the fight control system to small pilot commanded stick inputs which may otherwise affect the desired azimuth and elevation required for accurate target sighting while the aircraft is in a weapons launch mode.

While the '881 reference discloses an IFFC system with two axis fire control, commonly owned U.S. Pat. No. 5,263,662 entitled: *Helicopter Integrated Fire and Flight Control System Having Turn Coordination Control*, issued Nov. 23, 1993 to Fowler et al, and U.S. Pat. No. 5,465,212 entitled: *Helicopter Integrated Fire and Flight Control Having a Pre-launch and Post-launch Maneuver Director*, issued Nov. 7, 1995 to Fowler et al., each discloses IFFC systems with three axis (yaw, pitch and roll) fire control. The three axis system of the '662 reference provides yaw and pitch axis override by replacing the yaw and pitch rate error signals with the rate of change in the azimuth and elevation commands provided by the fire control system, and provides a bank angle signal to place the aircraft at a desired roll angle. The system's objective is to provide a substantially coordinated turn and optimum stabilization during aircraft maneuvers in the weapon launch period. Similarly the '212 reference discloses a three axis IFFC which provides the forward acceleration and velocity profile necessary to satisfy optimum aircraft to target weapon launch.

Each of the referenced IFFC systems incorporates a fire control system logic which is functionally integrated with the aircraft's flight control system so as to provide seamless transition between flight control and fire control authority when commanded by the pilot. Each of these systems further includes a bi-functional flight control comprising a primary flight control system (PFCS) with primary authority in enacting pilot commanded inputs to the aircraft, and an automatic flight control system (AFCS) which supplements PFCS performance with additional trim functions to optimize the aircraft's dynamic response to the commanded inputs. The PFCS and AFCS are functionally coordinated and their performance is characterized by a model following transfer function of the type disclosed in commonly owned U.S. Pat. No. 5,238,203 entitled: *High Speed Turn Coordination for Rotary Wing Aircraft*, issued Aug. 24, 1993 to Skonieczny et al.

While the prior art IFFC systems each address the primary aircraft flight control dynamics which affect weapon aiming accuracy, there are secondary considerations. One such consideration is the safe operation of the aircraft engine during aircraft maneuvers in the weapons launch mode.

Each of the prior art IFFC systems are implemented in a flight control system which incorporates a model following algorithm. In these referenced systems the IFFC system is enabled when the aircraft is placed in an Altitude Hold mode, which automatically maintains the altitude of the aircraft within tolerance limits. Depending on ambient air density conditions, the Altitude Hold may place excessive torque demands on the engine which, if sustained for long periods of time, may either damage or shorten the engine life. These prior art IFFC systems require that the pilot continually monitor engine torque levels using the information displays provided (typically helmet mounted display system) and then manually override the Altitude Hold function when torque demands are excessive. During periods of weapon launch which typically involve aggressive maneuvering to achieve optimum aircraft to target orientation, the manual monitoring of engine torque adds work to an already high pilot workload.

If the engine torque is to be controlled automatically, it must be done by regulating the aircraft's altitude while in an Altitude Hold mode. This requires fire control authority in the lift, or collective axis, which is not known in the prior art IFFC systems.

DISCLOSURE OF INVENTION

One object of the present invention is an IFFC system capable of providing automatic engine torque limiting in conjunction with a flight control portion incorporating a model following flight control portion. Another object of the present invention is to provide this torque limiting function automatically, without supervision or involvement of the pilot.

According to the present invention, when engaged, the IFFC monitors and compares the sensed actual torque value in successive real time intervals with referenced maximum and minimum torque versus time reference limits and, in the presence of above limit actual torque for a prescribed time interval, the IFFC automatically reduces the collective axis command. In further accord with the present invention, the IFFC modifies the collective command signal with a down collective command signal whose magnitude is proportional to the detected over torque magnitude. In still further accord with the present invention, the IFFC further provides an altitude error washout signal to the flight control portion to reduce the authority of the Altitude Hold function during over torque conditions, thereby eliminating conflict between the Altitude Hold maintenance of a set point altitude and the down collective command provided by the torque limiting function.

In still further accord, the altitude reference in the model-following altitude hold system is forced to track the sensed actual altitude, and the altitude and rate error feedback paths are canceled to minimize engage/disengage transients. In still further accord with the present invention, the IFFC torque limiting function permits pilot override of the down collective command signal by moving the displacement collective stick against trim while leaving the collective AFCS engaged; alternatively, the pilot can disable stick trim and the vertical AFCS by pressing a collective trim release switch located on or near the displacement stick grip.

The collective axis authority of the fire control portion of the present IFFC system is interfaced with the model following Altitude Hold mode of the flight control portion. The collective axis interface is similar to the implementation in the other IFFC axes, and consists of a vertical rate command and a proportional feedforward command. The fire control collective authority is enacted when the Altitude Hold mode is engaged by the pilot, and is otherwise inactive. The torque limiting function reduces collective when the required engine torque exceeds available torque. The pilot can override these functions by moving the displacement collective stick on the left side of the cockpit. The pilot can move the collective against trim while leaving the collective AFCS engaged, or the pilot can disable stick trim and the vertical AFCS by pressing the collective trim release switch (the trigger switch under the collective stick grip).

The torque limiting function of the present IFFC system, when engaged, limits the pilot's ability in demanding more engine power than available during aggressive maneuvering of the aircraft. The sensed actual engine torque is compared to a preset upper torque limit that is a function of density altitude. The resulting difference signal represents a torque error signal which is modified through both proportional and interval gain paths and provided as a down collective modifying command signal to the flight control portion. Concurrent with the proportional plus integral down command, the IFFC also provides the derivative of the engine torque error signal, which is also feed back to the flight control to provide a damping term.

The IFFC's torque limiting function only provides a down collective modifying command signal, i.e., it only reduces the collective access displacement so as to prevent over torque conditions. It will not increase collective command beyond that required by the Altitude Hold function.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
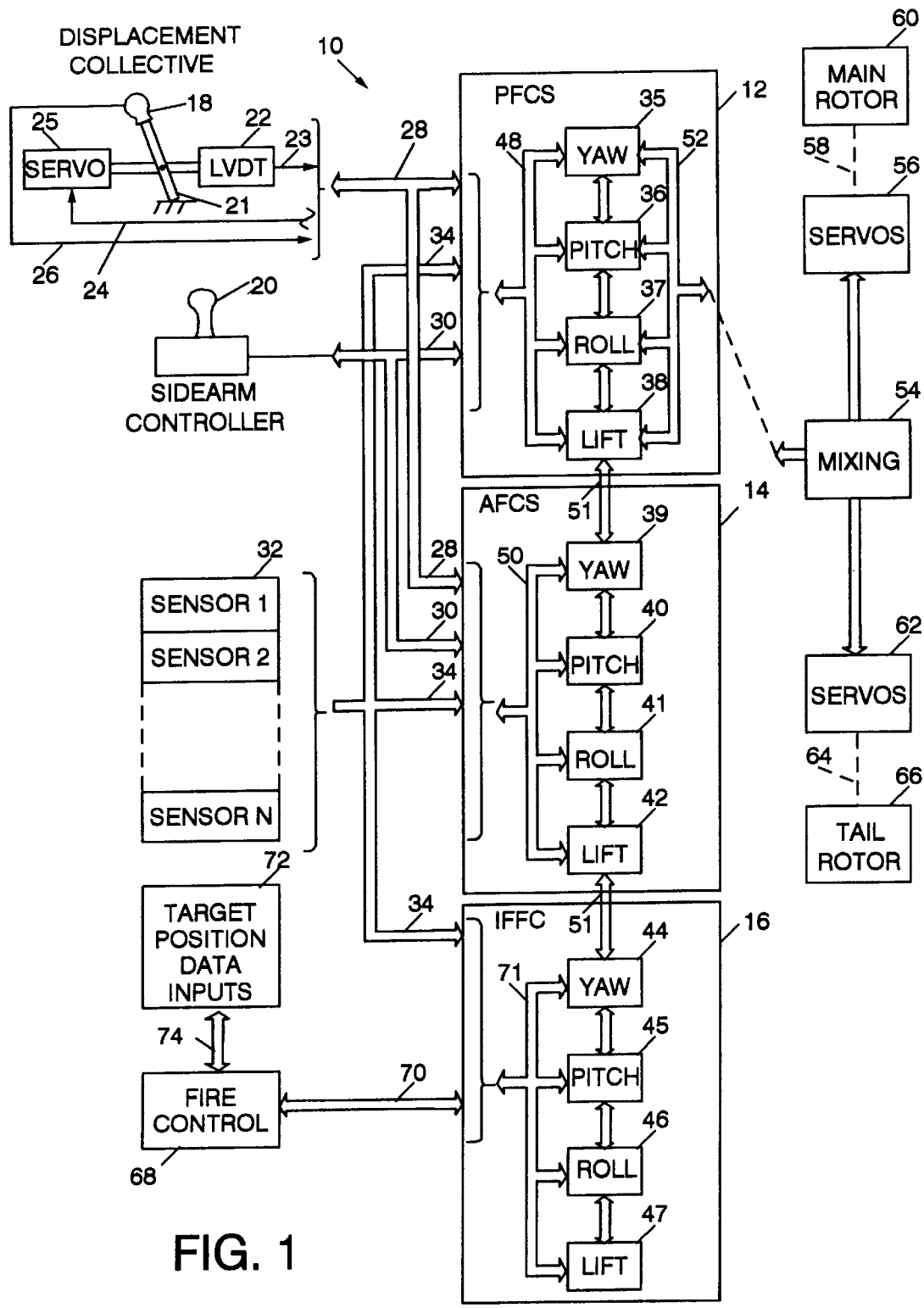
FIG. 1 is a system block diagram of an IFFC system according to the present invention.

Referring to FIG. 1, the integrated fire and flight control (IFFC) system 10 of the present invention includes a primary flight control system (PFCS) 12, an automatic flight control system (AFCS) 14, and an IFFC 16. The PFCS 12 and AFCS 14 each receive displacement command signals from the pilot operated displacement collective stick 18 and force command signals from a four axis side arm controller 20. The displacement stick is typically located to the left of the pilot's seat and pivots about a point 21. The position of the displacement stick is sensed by a linear variable differential transformer (LVDT) 22 which provides an electrical signal indicative of stick position on a line 23 to the PFCS and AFCS. To give the pilot tactile feel of the collective load (which is otherwise missing in a "fly by wire" control system) the PFCS provides a drive signal on a line 24 to a servo 25, which in turn drives the displacement collective stick 18 so that it tracks the command signal on line 24.

The displacement collective stick also includes several pilot switched discrete signals which are provided through line 26 and, together with the signals on lines 23 and 24, are presented through trunk lines 28 to the PFCS and AFCS, which also receive the output force signals from the sidearm controller on trunk lines 30. The PFCS, AFCS, and IFFC 16 each receive sensed signals from aircraft sensors 32 on lines 34. The sensed signals are representative of the instantaneous actual value of selected aircraft parameters including: vertical acceleration, vertical rate, radar altitude, barometric altitude, angular rate, attitude, and velocity.

It should be understood that the reference herein to the term trunk lines is a figurative term for the collective signal pathways between the various elements of the system 10. As known to those skilled in the art, while the individual signal paths may be conductive wires which are bundled in trunks for purposes of utility and/or protection (the trunk lines may be shielded against both mechanical and electro-magnetic interference), the "trunks" may equally well be digital signal busses, such as MIL-STD-1553, ARINC 429, 629, or RS422.

As described in U.S. Pat. No. 5,263,662 cited hereinbefore, the PFCS and AFCS each have separate yaw, pitch, roll and lift control logic for providing four axis control of the aircraft. The logic is included in PFCS control modules 35–38 and AFCS control modules 39–42, respectively. In the present system 10, however, the IFFC 16, while including yaw, pitch and roll control modules 44–46 similar to those modules described in the '662 reference, it further includes lift control module 47 to permit the IFFC to also provide vertical axis control as well as yaw, pitch and roll axis flight control of the aircraft during target acquisition in the presence of the pilot initiated coupled aiming flight mode. Within the PFCS the control modules 35–38 receive the pilot command signals from the displacement collective stick 18 and sidearm controller 20 on lines 28, 30, as well as the sensed parameter signals on lines 34, through trunk lines 48. Similarly, these signals are distributed within the AFCS on lines 50 to control modules 39–42. As shown and described in detail in the hereinbefore cited references to U.S. Pat. No. 5,238,203 to Skonieczny et al; U.S. Pat. No. 5,263,662 to Fowler et al; U.S. Pat. No. 5,310,135 to Fowler et al; and U.S. Pat. No. 5,331,881 to Fowler et al, each of which are hereby incorporated by reference herein, the PCFS and AFCS each use a model following algorithm in each of the four control axes to shape the pilot's side arm controller and displacement stick commands to produce the desired aircraft response. The control modules of both systems, which are connected together through lines 51, collectively provide rotor command signals on PFCS output lines 52 to the aircraft's rotor mixing function 54. In response, the mixing function 54 commands displacement of mechanical servos 56 and linkages 58 to control the tip path plane of main rotor 60, as well as commanding displacement of tail rotor servos 62 and linkages 64 to control the thrust of the aircraft's tail rotor 66.

The IFFC receives, in addition to the sensed aircraft parameter signals on the lines 34, fire control command signals from a fire control system 68 on lines 70. These signals are presented through trunk lines 71 to the IFFC control modules 44–47. The fire control system 60 provides the fire control commands in response to target position data presented to it from target position/angle data inputs 72 on lines 74. The target position/angle data may be provided from a number of alternate, well known sources, such as line-of-sight angle sensors, map and position data, infrared sensors, laser sensors, and radar sensors.

The IFFC control modules 44–47 are also connected through lines 51 to the four axis control modules in the PFCS and AFCS. As described hereinbefore each of the different axis control modules incorporate a model following algorithm. In the yaw, pitch and roll axes the model following algorithm is incorporated in the PFCS, which has primary authority in these three axes. In the collective axis, however, the mechanical stick has primary authority so the model following algorithm is located within the AFCS, as shown in FIG. 2.

Figure 2A:
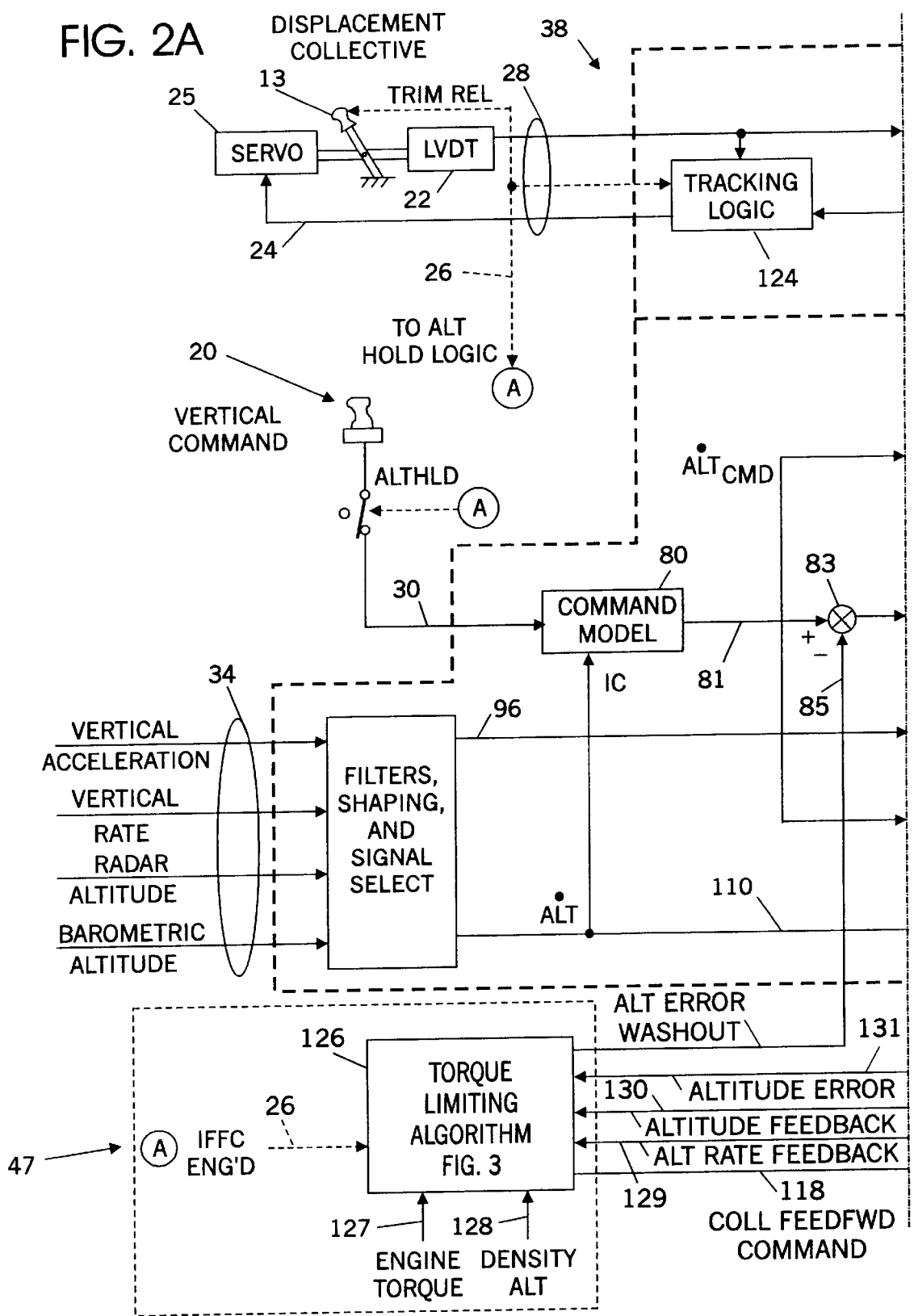
FIGS. 2, 2a and 2b is a top level functional block diagram of the control logic of the system of FIG. 1.
Figure 2B:
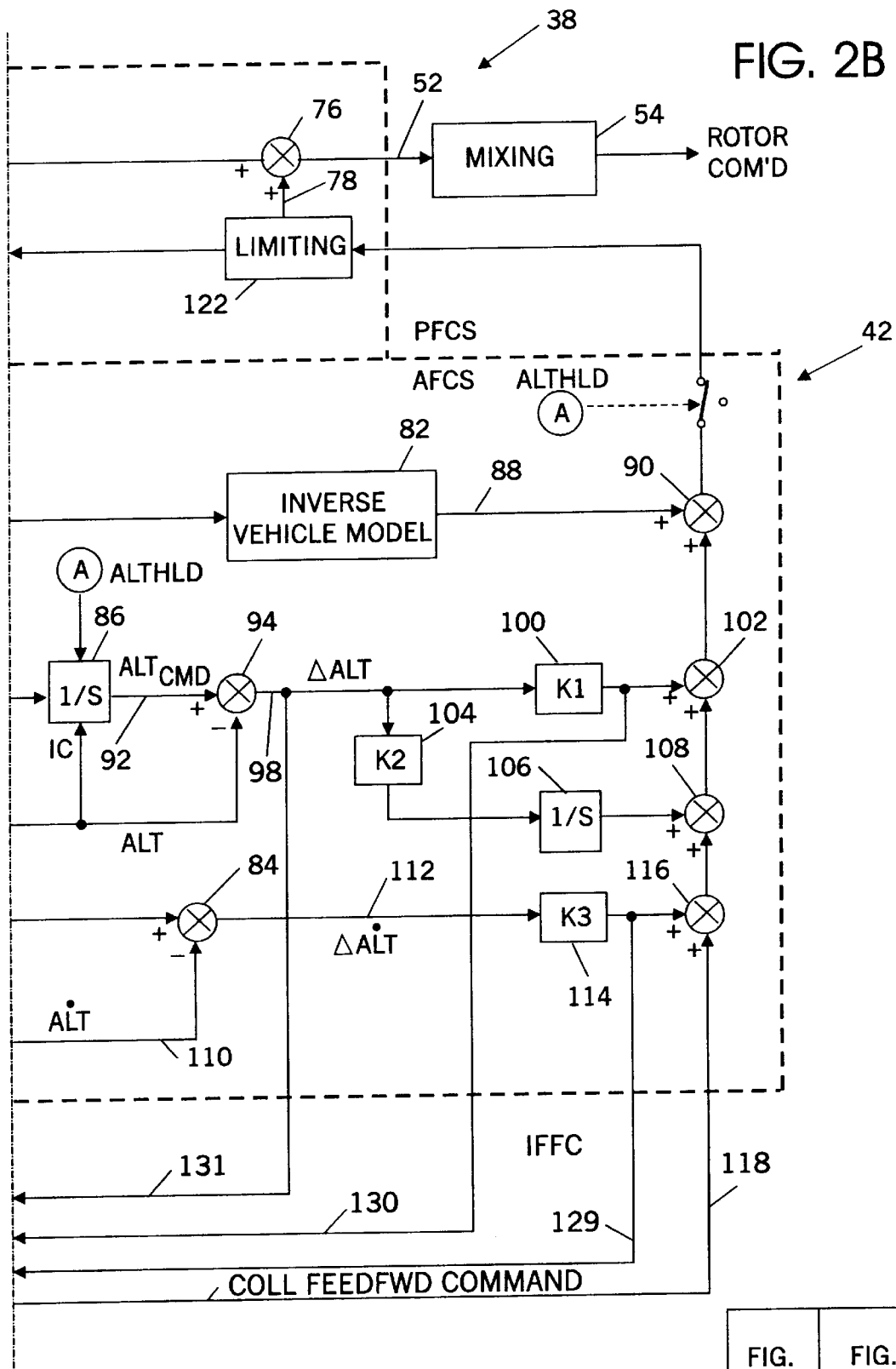
Figure 2:
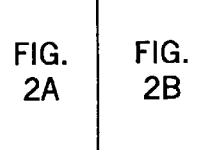

Referring now to FIG. 2, which illustrates the functional interconnection of the lift axis control modules: 38, 42 and 47 of the PFCS, AFCS, and IFFC respectively. In the best mode embodiment of the IFFC system it has been deemed preferable to have the PFCS and AFCS functional roles altered for the collective axis control modules. The PFCS in the collective axis control is essentially a fill mechanical control in consideration of the pilot having a displacement collective stick, and the AFCS embodies the electronic content of the flight control, including the model following algorithm. The PFCS control module 38 (FIG. 1) receives the pilot command signal entered through the displacement collective stick 13 on line 28, where it is presented directly to PFCS summing junction 76. The pilot commanded collective is there summed with a modifying collective command signal presented on line 78 to the summing junction from the AFCS, which is described in detail hereinafter. The summed resultant signal becomes the actual collective command signal which is presented through output lines 52 to the mixing function 54.

The AFCS control module 42 receives the vertical command signals from the pilot through the sidearm controller 20 on lines 30, and the sensed aircraft parameter signals (from sensors 32, FIG. 1) on lines 34. The AFCS also receives the pilot discrete signal inputs on the lines 26, which include an "Alt Hold" discrete input (labeled A) which enables (when Alt Hold is selected) or disables (when Alt Hold is not selected) the AFCS modifying collective command signal from reaching the summing junction 76; the result being that when Alt Hold is not selected the AFCS and, therefore, the torque limiting constraint algorithms from the IFFC control module 47 do not modify the pilot commanded collective signal, which is presented as is directly to the rotor mixing function.

In normal operation the pilot may enter vertical rate command information to the AFCS by pulling up or pushing down on the sidearm controller to command a climb or descent. These command signals are presented within the AFCS to a command model 80, which is a first order lag filter that provides the filtered altitude rate command signal on lines 82 to the inverse vehicle model transform 82, and to summing junctions 83, 84. The summary function 83 also received a proportional plus rate "Altitude Error Washout" signal on line 85 from the IFFC 47 torque limiting function. The summed resulting signal is presented to an integrator 86. The inverse model 82 is typically a Z-model transform, which may be embodied as a first order lead filter, as described more fully in the hereinbefore referenced U.S. Pat. No. 5,238,201, and which provides a proportional signal representation of a modified commanded vertical displacement signal on line 88 to AFCS output summing junction 90.

The integrator 86 integrates the altitude rate of change signal from junction 83 to provide an altitude command on lines 92 to summing junction 94, where the integral is summed with the aircraft's sensed actual altitude on line 96 to provide the summed result as an altitude error signal on line 98. This error signal is multiplied by a proportional gain factor K1 100, and the proportional resultant signal is presented to summing junction 102. The error signal is also multiplied by gain K2 104 and integrated through integrator 106 to provide an integral altitude signal to summing junction 108. Finally, the summing junction 87 sums the altitude rate of change signal on line 82 with the aircraft's sensed actual vertical rate on line 110 to provide an altitude rate of change error signal on line 112. This rate error signal is multiplied by gain K3 114 and presented to sum junction 116.

Figure 3A:
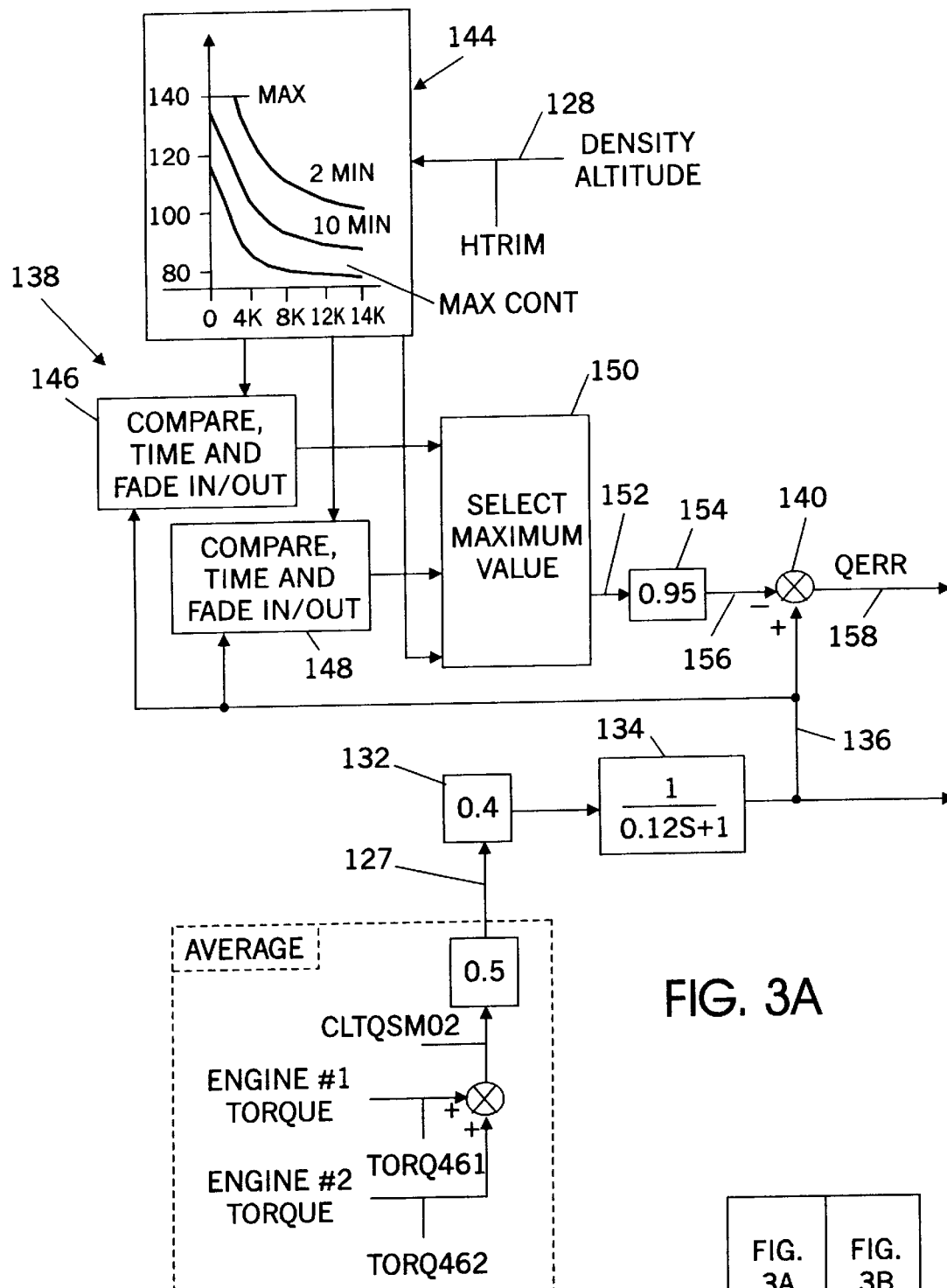
FIGS. 3, 3a and 3b is a functional block diagram of a portion of the control logic of FIG. 2.
Figure 3:
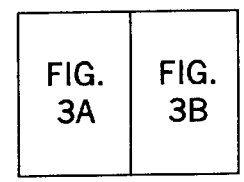
Figure 3B:
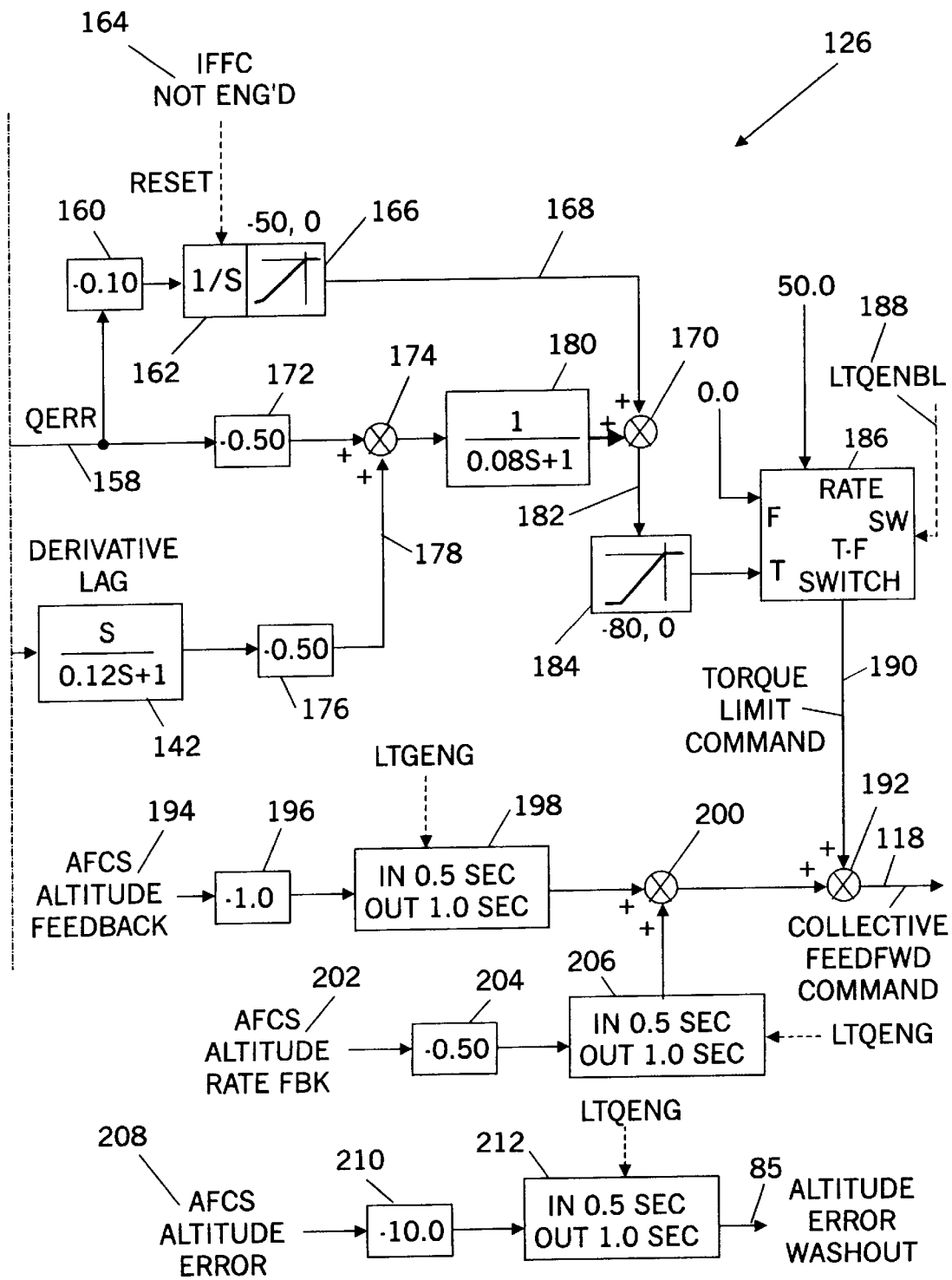

The net summed signal from junction 108 and 116 is a proportional plus integral plus derivative feedback signal which is successfully summed at junctions 102 and 90, and where it is summed with a collective feedforward command signal on lines 118 from the IFFC 47 torque limiting function (FIG. 3). As described hereinafter with respect to FIG. 3, this is a proportional plus integral plus derivative signal. presented on lines 120 to junction 94. The summed result of junction 94 is presented through lines 51 to the PFCS module 38 as the modifying collective command signal. Within the PFCS it is presented on the line 78 to the summing junction 76 via the limiting circuitry 122. The limiting circuitry splits the modifying collective signal into low frequency and high frequency components. The low frequency component is rate limited and presented through tracking logic 124 which then backdrives the displacement collective stick through servo 25 to provide the pilot with the necessary tactile feel of the full collective load. The high frequency component is amplitude limited by 122 and passes to the line 78 input of the junction 76, the summed output of which is the modified collective command signal presented to the rotor mixing function 54.

Referring to FIGS. 2 and 3, the IFFC control module 47 receives an IFFC engaged discreet signal on lines 26, which is indicative of a weapons launch mode selected by the pilot, together with the pilot actuated Altitude Hold discreet enable signal. As described hereinafter with respect to FIG. 3, if the IFFC engagement signal is not set then the torque limiting function is disabled. Similarly, in the best mode embodiment, the torque limiting function is only enabled in the presence of the Altitude Hold state, although this is an elected limitation and may vary with different aircraft applications.

The torque limiting function 126 within the IFFC collective control module 47, also receives sensed signals representative of: actual sensed engine torque on lines 127, density altitude (a function of barometric altitude and ambient temperature) on lines 128, the altitude rate feedback on lines 129, the altitude feedback on lines 130 (although proportional to the altitude error the altitude feedback signal may differ in scale and dynamics, which are system specific), and the altitude error signal on lines 131. The output signals from the torque limiting function are the altitude error washout signal on line 85 and the collective feedforward command signal on line 118.

As shown in FIG. 3, the sensed engine torque on line 127 is a real time sensed value of engine torque, and in an aircraft with more than one engine it is the real time average torque value of all the engines. In a preferred embodiment the torque signal magnitude is scaled in block 132 to a percent of max. torque The result signal is then passed to a lag filter 134 to remove the high frequency noise. The filtered average engine torque signal from the lag filter 134 is presented on lines 136 to comparitor circuitry 138, to summing junction 140 and to a derivative lag filter 142.

The comparitor 138 includes a database function 144 having stored therein one or more torque limit signals, each associated with a reference altitude value and each having one or more different magnitude maximum engine torque values for one or more different duration prescribed time intervals. The magnitudes of the different maximum engine torque values associated with each torque limit signals are substantially inversely proportional to the duration of the associated prescribed time intervals, such that the maximum desired engine torque value decreases as the time duration increases. The actual torque signal on line 136 is compared within the comparitor 138 to two selected torque-versus-time limits which are deemed applicable to the particular aircraft flight profiles; one limit having a shorter time duration and greater torque value limit and the other having a longer time duration and a smaller torque value limit.

The actual torque signal is compared with the first and second limits at 146, 148, which, for purposes of description, are of a two and ten minute time duration. The torque limit values established for these time intervals are typically based on empirical engine data for known density altitude conditions. In the present embodiment, the database function 144 establishes the relationship between the density altitude value, as plotted along the abscissa (or horizontal axis) in values ranging from zero to sixteen thousand feet (16K), versus the torque values displayed along the ordinate (or vertical axis) ranging between a minimum value of approximately 80% of maximum torque up to 140% of maximum torque. The curves are labeled in time durations with a maximum continuous curve shown as that which correlates lower magnitude torque values with lower values of altitude. If the actual sensed torque value remains above any one of the two or ten minute limits, then that limit value is presented to the "select maximum value" function 150. The select maximum value function provides a time-out of the interval associated with the (for example) two minute duration. If the actual torque remains above the short term limit for that interval (i.e. when the time expires on the limit) that torque limit value is faded out and a lower torque limit is selected by the select maximum block; in this instance the ten minute duration limit. The select function seeks out the highest sustainable torque limit as its reference limit value. Therefore, if actual engine torque remains within the torque limit established by the ten minute interval the select maximum block provides that ten minute interval transfer function as the torque referenced limit on line 152. Given a continuous over torque condition the select maximum function will sequentially reject all of the interval time duration, higher torque limit transfers and establish the continuous time duration—minimum torque value as the limit condition. Typically, the continuous time duration operating curve provides maximum torque limits of near 80% at altitudes up to 4,000 ft. and less than 80% torque for altitudes up to 16,000 ft.

The referenced torque limit signal on line 152 is scaled by gain function 154 (for example, 0.95) to provide a margin below the selected torque limit on line 156. The scaled limit is then compared at summing junction 140 with the actual torque signal on line 136 to provide at line 158 a torque error signal equal to the difference therebetween. The torque error signal is multiplied by a negative gain 160 (typically minus 0.1) and integrated by integrator 162, which operates only if the IFFC system is engaged 164. The integral signal output is limited to negative values. In other words, only down collective commands are passed by the limiter 166. Typical limit ranges are from minus 50% to 0%. It is presented on line 168 to summing junction 170.

The torque error signal on line 158 is multiplied by a negative proportional gain 172 and presented to summing junction 174 together with the actual torque derivative signal value which is multiplied by proportional gain 176 and presented to the junction 174 on the line 178. The summed result signal from the junction 174 is a proportional plus rate signal which is passed through low pass filter 180 to the summing junction 170. The summed result signal from the junction 170 is then a proportional plus integral plus rate signal which is presented through lines 182 to limiter 184 which only provides a result in sum signal having a magnitude between selected negative limits. In the present embodiment, the limits are selected as minus 50% and 0& so that only down collective commands are passed. The down collective signal is then passed through a transient-free switch 186 which is controlled by the torque limiting enable discreet signal 188. This torque limiting enable is true (or enabled) when both the altitude hold state and IFFC engaged state are true and the torque error signal on line 158 is greater than 0. If the enable discreet signal 188 is true, the down collective command signal is passed through to line 190 as a proportional plus integral plus rate signal to summing junction 192.

The torque limiting function by itself provides the down collective command signal to reduce the actual engine torque while the altitude hold system may be commanding increased torque to maintain a set point altitude. To prevent these two functions from competing and interfering with each other's performance, the present invention provides a canceling signal which in effect neutralizes the altitude hold system when the torque limiting function is enabled. As shown in FIG. 3, this is performed by multiplying the AFCS altitude feedback signal 194 with a negative proportional gain (typically minus 1.0) 196 to cancel the entire altitude feedback path. The negative feedback signal is then passed through a fade function 198 to prevent step transient signal conditions. The negative altitude feedback signal is presented to summing junction 200. Similarly, the AFCS altitude rate feedback signal 202 is multiplied by a negative proportional gain 204 (typically minus 0.50) and presented through a similar fade circuit 206 to the second input of summing junction 200 (the AFCS altitude rate signal is only canceled by 50% as opposed to 100% for the altitude feedback signal). The output of summing junction 200 is presented to junction 192 which provides the summed signal output on line 118 (FIGS. 2, 3) as the collective feedforward command for down collective.

As a further enhancement of performance, the torque limiting function of the present IFFC system forces the AFCS model following altitude reference to follow the actual sensed altitude, thus "washing out" any altitude errors. This is done by multiplying the altitude error signal 208 by a negative proportional gain (typically minus 10.0) 210 and passing the result through fader circuit 212 to line 85 (FIGS. 2, 3) as the altitude error washout signal.

Figure 4:
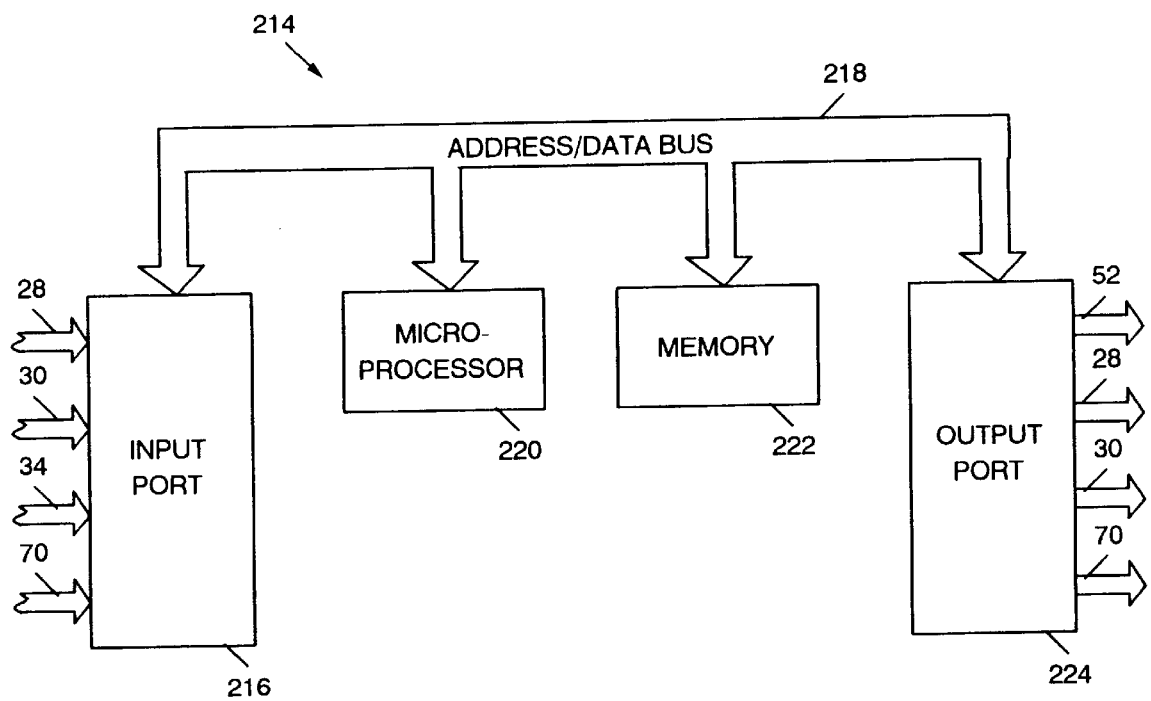
FIG. 4 is system block diagram of one embodiment capable of performing the control logic sequence illustrated by the elements of FIGS. 2 and 3.

The description heretofore of the present IFFC system functions has been disclosed in terms of functional block diagrams using frequency domain notation. It is understood by those skilled in the art the these functions as disclosed may be enacted in either dedicated hardware circuitry, or preferably in programmed software routines capable of execution in a microprocessor based electronics control embodiment. Referring to FIG. 4, in an exemplary embodiment of a microprocessor based control 214 suitable for implementing the IFFC system control modules functions, the input signal lines 28, 30, 34 and 70 from the displacement collective stick 18, the side arm controller 20, the sensors 32 and the fire control 68 are received at an input port 216 which may include analog-to-digital converters (not shown), frequency-to-digital converter (not shown), and such other signal conditioning functions, as may be deemed necessary by those skilled in the art to convert the actual IFFC signal format to digital signal format.

The input port is connected through buss 218 to a central processing unit (CPU) 220, to memory 222, and to an output port 224. As known, the buss provides signal transfer between the elements of the microprocessor control. The CPU 220 may be any type of known microprocessor having performance characteristics such as may be deemed suitable by those skilled in the art for performing the invention in the manner described. Similarly the memory 222 is a known functional type, such as RAM, UVPROM, or EEPROM, as may be deemed suitable for the application by those skilled in the art. The output port 224 provides: the PFCS output signals to the rotor mixing function on lines 52, the return signal from the PFCS to the Displacement collective stick on lines 28, the return signals from the AFCS to the sidearm controller on lines 30, and the exchanged communications between the IFFC and the fire control over lines 70. The output port may comprise digital to analog converters (not shown), parallel to serial converter (not shown) and a discrete output driver (not shown).

The IFFC of the present invention provides four axis (pitch, roll, yaw and collective, or lift) control. The IFFC control laws are integrated with the advanced flight control laws of the baseline rotary wing aircraft. These control laws are implemented in the pitch, roll, yaw, and collective control axes. In general the IFFC control laws generate body axis angular rate (or vertical rate) commands that drive command models in the AFCS and feedforward commands that sum with the AFCS output commands.

The collective axis of the IFFC control laws supports launch of both guided and unguided weapons by providing engine torque limiting. The torque limiting function reduces collective when the required engine torque exceeds available torque. The torque limiting function is interfaced with the model following Altitude Hold mode such that if Altitude Hold is not engaged the torque limiting mode is inactive. The pilot can override these functions by moving the displacement collective stick on the left side of the cockpit. The pilot can move the collective against trim while leaving the collective AFCS engaged, or the pilot can disable stick trim and the vertical AFCS by pressing the collective trim release switch (the trigger switch under the collective stick grip).

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. Integrated fire and flight control (IFFC) apparatus for controlling the response of a weapons equipped rotary wing aircraft to commanded maneuvers from pilot operable controls, including a displacement collective stick for commanding a change in the rotary wing controlled surfaces, and one or more pilot operable switches for providing selectable actuation of IFFC operating modes, including an altitude hold mode and a weapons launch mode, the aircraft having sensors for providing sensed signals indicative of the actual values of the aircraft's operating parameters, and having a source of weapon solution command signals indicative of operating parameter values deemed desirable to optimize aircraft operation in the weapons launch mode, the apparatus comprising;

flight control means, responsive to the pilot operable controls, to the sensed signals, and to fire control signals presented thereto, and including signal processing means having memory means for storing signals representative of one or more flight control algorithms which prescribe desired present values of selected aircraft operating parameters in response to present values of the sensed signals and of said fire control signal, said flight control means providing flight control signals for modifying pilot commanded changes to the rotary wing controlled surfaces in response to said desired present values of said flight control algorithms; and fire control means, responsive to the pilot operable controls, the sensed signals, and to the weapon solution command signals, for providing, in the presence of the weapons launch mode, said fire control signal to said flight control means to alter said desired present values and said flight control signals in dependence on the weapon solution command signals;

as characterized by:

the sensed signals including actual engine torque and actual altitude;

said flight control signals including a collective axis command signal for modifying pilot commanded changes in the aircraft's collective axis in response to a desired present value of altitude; and wherein said fire control means includes a reference source of torque limit signals, each of which identify a maximum torque value for an associated value of altitude, said fire control means comparing the actual torque and actual altitude sensed signals to said torque limit signal of corresponding altitude and, in the presence of an actual torque signal value greater than said torque limit signal, presenting said fire control signals such as to modify said collective axis command signal in a manner which reduces the aircraft's actual altitude.

2. The apparatus of claim 1, wherein said fight control means comprises:

primary flight control system (PFCS) means, responsive to the pilot operable controls and to said flight control signals, for modifying pilot commanded changes to the rotary wing controlled surfaces in dependence on said collective axis command signal; and automatic flight control system (AFCS) means, including said flight control algorithms for providing said collective axis command signal to said PFCS means;

as characterized by:

said flight control algorithms embodying a model following transfer function for providing said desired present values in response to the sensed signals.

3. The apparatus of claim 2, wherein said model following transfer function incorporates a Z transform.

4. The apparatus of claim 2 wherein:
said AFCS means, in the presence of an altitude hold mode, provides said collective command signal in response jointly to said desired present values, and to an altitude error signal proportional to the difference sum magnitude of said actual altitude sensed signal and a reference altitude signal value; and
said fire control means, in the presence of the altitude hold mode further provides said fire control signals in a manner such as to substantially minimize the magnitude of said altitude error signal.

5. The apparatus of claim 4, wherein said fire control signals further include an altitude washout signal which substantially minimizes the magnitude of said altitude error signal.

6. The apparatus of claim 1, wherein:
said reference source of torque limit signals is responsive to said actual altitude sensed signal, for providing one or more of said torque limit signals for each of a plurality of reference altitude values, each said torque limit signal associated with a common reference altitude value having one or more maximum torque values, each associated with a different duration prescribed time interval; and wherein:
said fire control means compares said actual torque sensed signal in substantially real time sample intervals with those of said torque limit signals having associated reference altitude values which are proximate to the actual altitude value, and provides said fire control signals such as to modify said collective axis command signal in response to the actual torque sensed signal magnitude being greater than a maximum torque value for a time duration which is equal to or greater than the prescribed time interval which is associated with said maximum torque value.

7. The apparatus of claim 6, wherein the magnitude of said maximum torque values for a common reference altitude value vary in a substantially inverse proportional manner to the duration of their associated prescribed time interval.

8. The apparatus of claim 1, wherein:
said reference source of torque limit signals comprises data base means for storing a plurality of said torque limit signals, each said torque limit signal being associated with a related one of a plurality of different reference altitude values, from a minimum altitude to a maximum altitude, and each having a different maximum torque value for each of different duration prescribed time intervals associated with the same reference altitude value, the magnitude of said maximum torque values for each said torque limit signal varying in a substantially inverse proportional manner to the duration of the related ones of said prescribed time intervals; and wherein
said fire control means compares the actual torque value in real time with succeeding ones of said torque limit signals, from that associated with a reference altitude value which is proximate to said actual altitude to those associated with succeedingly lower reference altitude values, and selects that one of said torque limit signals whose maximum torque values are greater than the actual torque value for the duration of their associated prescribed time intervals, said fire control means providing a down collective signal to said flight control means to command a reduction in the aircraft's altitude by an amount proportional to the difference altitude value between the actual altitude and the reference altitude value associated with said selected torque limit signal.

9. The apparatus of claim 8, wherein:
said reference source provides a default torque limit signal having a minimum magnitude torque value and a continuous duration prescribed time interval; and
said control means, in response to the actual torque value being greater than the maximum torque values of each said torque limit signal, selects said default torque limit signal.

10. The apparatus of claim 9, wherein said default torque limit signal continuous duration prescribed time interval has a maximum torque value substantially equal to 80 percent of maximum engine rated torque at altitudes substantially up to 4,000 feet and less than 80 percent of maximum engine rated torque for altitudes substantially up to 16,000 feet.

11. The apparatus of claim 8, wherein said fire control means provides said down collective signal in the presence of an altitude hold mode.

12. The apparatus of claim 8, wherein said torque limit signals range from a minimum reference altitude of substantially zero feet with a maximum torque value substantially equal to 140 percent of maximum engine rated torque, to a maximum reference altitude of substantially sixteen thousand feet with a maximum torque value substantially equal to 80 percent of maximum engine rated torque.

13. The apparatus of claim 11, wherein said fire control means does not increase the collective command signal to increase aircraft altitude beyond that required by the altitude hold mode.

14. The apparatus of claim 2, wherein:
said reference source of torque limit signals comprises data base means for storing a plurality of said torque limit signals, each said torque limit signal being associated with a related one of a plurality of different reference altitude values, from a minimum altitude to a maximum altitude, and each having a different maximum torque value for each of different duration prescribed time intervals associated with the same reference altitude value, the magnitude of said maximum torque values for each said torque limit signal varying in a substantially inverse proportional manner to the duration of the related ones of said prescribed time intervals; and wherein
said fire control means compares the actual torque value in real time with succeeding ones of said torque limit signals, from that associated with a reference altitude value which is proximate to said actual altitude to those associated with succeedingly lower reference altitude values, and selects that one of said torque limit signals whose maximum torque values are greater than the actual torque value for the duration of their associated prescribed time intervals, said fire control means providing a down collective signal to said flight control means to command a reduction in the aircraft's altitude by an amount proportional to the difference altitude value between the actual altitude and the reference altitude value associated with said selected torque limit signal.

15. The apparatus of claim 14, wherein:
said reference source provides a default torque limit signal having a minimum magnitude torque value and a continuous duration prescribed time interval; and
said control means, in response to the actual torque value being greater than the maximum torque values of each said torque limit signal, selects said default torque limit signal.

* * * * *